Dec. 7, 1948.　　　　F. A. MEUNIER　　　　2,455,792
LIMITER CIRCUIT FOR ELECTRIC TESTING APPARATUS
Filed Jan. 29, 1948　　　　2 Sheets-Sheet 1
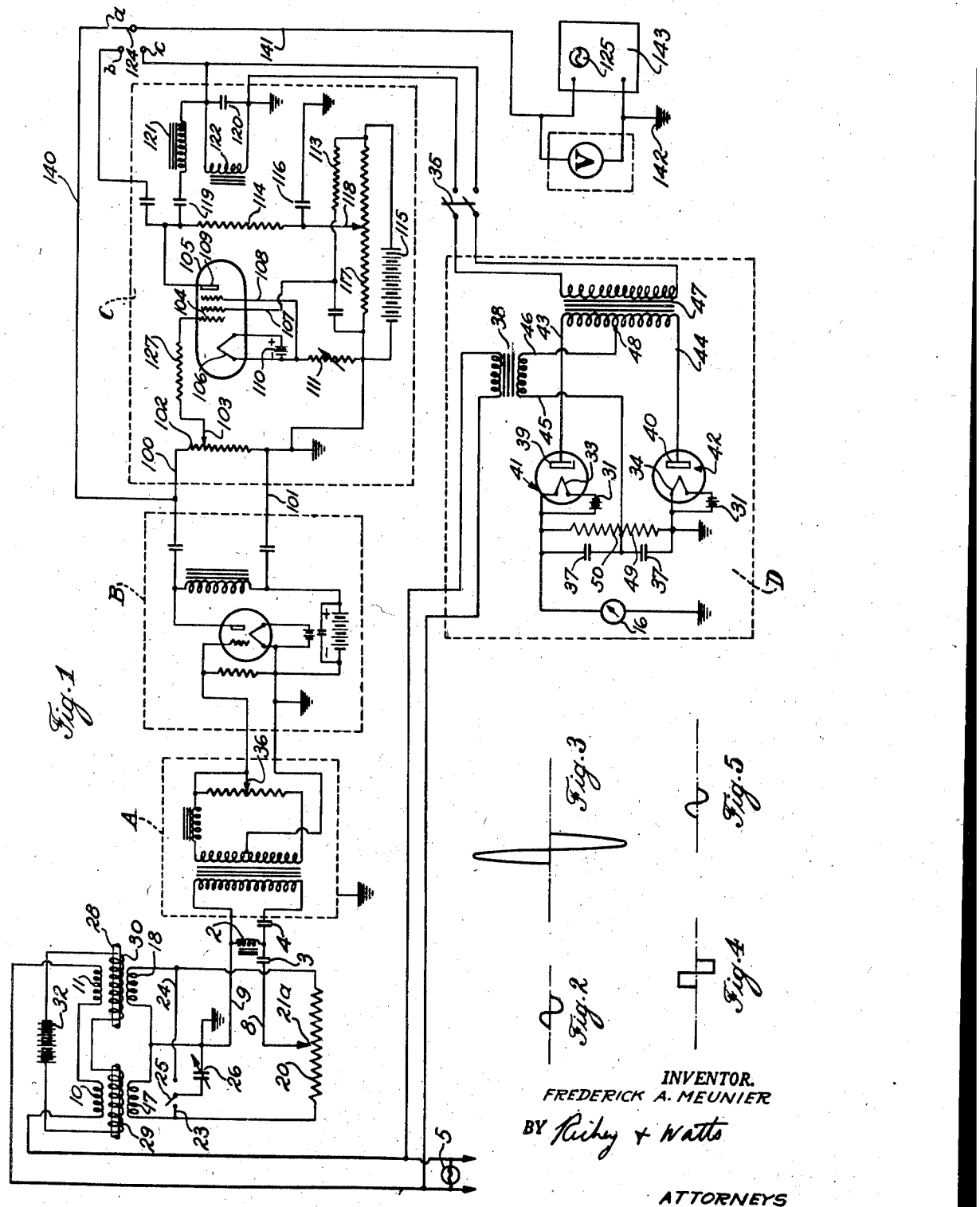
INVENTOR.
FREDERICK A. MEUNIER
BY Richey + Watts
ATTORNEYS INVENTOR.
FREDERICK A. MEUNIER
BY Richey & Watts
ATTORNEYS

Patented Dec. 7, 1948

2,455,792

UNITED STATES PATENT OFFICE 2,455,792

LIMITER CIRCUIT FOR ELECTRIC TESTING APPARATUS

Frederick A. Meunier, Cleveland, Ohio, assignor to Republic Steel Corporation, Cleveland, Ohio, a corporation of New Jersey Application January 29, 1948, Serial No. 5,172

8 Claims. (Cl. 175—183)

This application is a continuation-in-part of my co-pending application Serial No. 449,067, filed June 30, 1942, now abandoned.

The invention relates to improvements in methods and apparatus for non-destructive testing and more particularly to an apparatus for testing magnetic articles such as tubes or the like for locating defects therein.

The invention is particularly useful for testing tubing for defects such as cracks or slag inclusions and is an improvement in the methods and apparatus shown and described in United States Letters Patent to Horace C. Knerr and Cecil Farrow, Re. 21,003 of February 14, 1939.

The aforesaid reissue patent contemplates testing magnetic articles by subjecting them to a magnetic field obtained by applying direct current to a coil or solenoid which surrounds the article. This causes the article to be magnetically saturated and renders the same substantially non-magnetic with respect to the testing current. The testing current is applied to the article by applying an alternating current to another coil which also surrounds the article. A third set of coils is also contemplated which act as secondary coils in which alternating currents are induced from the coils to which the alternating current is supplied.

In the arrangement described in the aforesaid reissue patent, these secondary currents are applied to a thyratron detecting device which is also supplied with alternating current of the same frequency and phase as supplies current to the test coils.

When the article under test is passed through these coils it has substantially no effect on the circuit so long as the tube is perfect. If, however, the tube should have a crack or defect this defect causes a shift in the phase of the alternating current in the secondary test coils. Then since the thyratron tube device has alternating current fed from the same source and is in the same phase as that of the current being applied to the test coils, if a tube causes a phase shift in the induced currents in the secondary circuit the thyratron tube device will function to indicate the defect. All of this has been clearly described in the aforesaid patent.

I have found, however, that sometimes tubes or rods being tested have characteristics, which are not necessarily defects, that cause a change in amplitude in the induced currents in the secondary. That is, the magnetic structure of the tube may vary throughout its length, being capable of being more highly magnetized at one point than another. These conditions are not necessarily defects and although they may not cause a shift in phase they may cause a change in amplitude of the current induced to raise or reduce the amplitude to the extent that the prior apparatus is not capable of being adjusted to indicate defects below a certain limit in the presence of some of the larger of such variations in magnetic structure. The most common occurrence is a raise in amplitude. The character of this amplitude change is described in a Patent 2,415,789 granted to Cecil Farrow on February 11, 1947, on an application filed June 13, 1942, copending with my original application Serial No. 446,907, now Patent No. 2,415,789, granted February 11, 1947. Although the thyratron tube device is sensitive primarily to phase shift, if amplitude changes are present when the device is adjusted to indicate very small defects its sensitivity is such that an amplitude change may cause a defect to be indicated which is not necessarily an undesirable defect.

It is therefore an object of this invention to provide an improved method and apparatus for indicating defects.

It is another object of my invention to provide an apparatus which has increased sensitivity to small defects and which thus permits smaller defects to be located than was heretofore possible.

It is another object of my invention to provide an improved testing apparatus wherein the characteristics of the article under test which cause voltage changes not necessarily indicative of defects will not be indicated as defects.

Another object of the invention is to provide means whereby the circuit may be quickly and easily adjusted for the testing of articles by persons having a minimum of skill in operating such apparatus.

Still other objects of the invention and the invention itself will become more apparent from the following description of an embodiment thereof, which description is illustrated by the accompanying drawings and forms a part of this specification.

In the drawings:

Fig. 1 is a circuit diagram illustrating one form of the apparatus of my invention.

Figs. 2, 3, 4 and 5 are separate views of the voltage wave form as would be observed on the screen of an oscilloscope at certain stages of the signals passing through the circuit.

Figure 6:
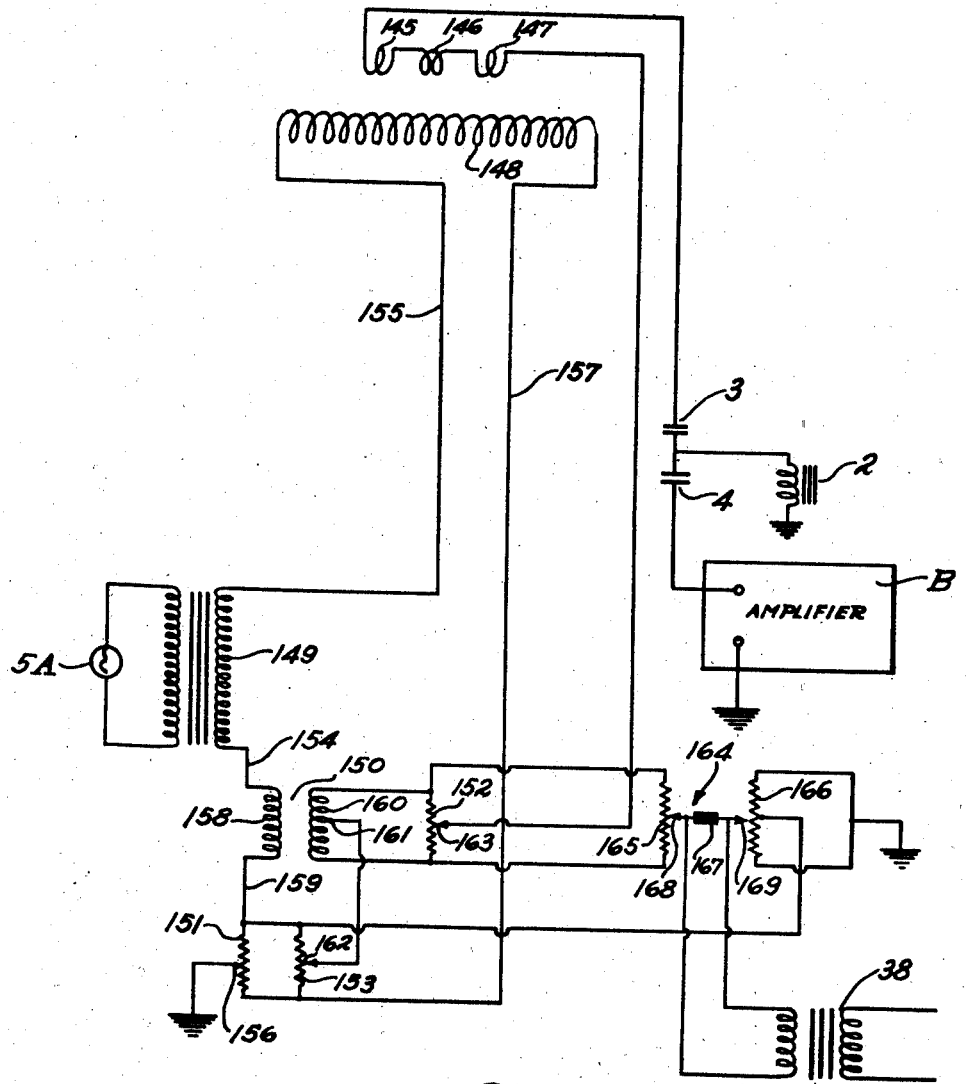
Fig. 6 is a fragmentary circuit diagram illustrating a modification of the arrangement of Fig. 1.

Referring now to the drawings:

Fig. 1 shows the circuit diagram for a form of the invention wherein a source of alternating current 5 is connected to the energizing coils 10 and 11. A source of direct current is shown at 32 being connected to the direct current saturation coils 29 and 30. The pickup or secondary coils are illustrated at 17 and 18. The coils may all be arranged so that tubes such as 27 and 28 may be passed therethrough in the same manner illustrated in the aforesaid Reissue Patent No. 21,003. The pickup coils 17—18 are disposed in a balancing circuit including the resistance 20 disposed therebetween and the usual balancing means including the switch 25 arranged to be alternately connected to the leads 23—24 and the condenser 26. The output from the pickup circuit is through the leads 9 and 8, the latter being connected to the slider 21a which operates on the resistance 20. The output is connected through a filter comprising a pair of series condensers 3 and 4 in the line 8 and a reactance 2 across the line in order to remove random voltages or variations therein and transient variations other than those due to phase shift. Such a filter constitutes a high-pass filter. The lines 8 and 9 then connect to the phase control section A which is substantially the same as shown in Fig. 5 of the reissue patent except for the substitution of an iron core reactor.

The output from the phase control section A is fed to the amplifier B. Inasmuch as the final steps in its adjustment and operation are substantially the same as described in the aforesaid reissue patent up to the point where the output of B is fed to what is hereinafter called the limiter circuit, a brief summary thereof will be included.

For detecting phase variations at the voltage output leads, a phase sensitive detector D is provided in accordance with my present invention. This detector comprises a pair of rectifiers 41 and 42 connected in series opposition with respect to input leads 43 and 44 and connected in parallel with respect to reference voltage leads 45 and 46. The input connections to the input leads 43 and 44 are preferably made through a transformer 47 having a secondary-winding center tap 48. A load resistor 49 is provided having a center tap 50. A suitable indicating or recording instrument such as a volt meter 16 is provided for measuring net voltage drop across the load resistor 49. It will be observed that the reference voltage leads 45 and 46 are connected between the center taps 48 and 50 of the transformer 47 and the load resistor 49. Preferably, smoothing condensers 37 are connected across the two portions of the load resistor 49 between the ends and the center tap 50.

The reference-voltage leads 45 and 46 are energized from the same source which energizes the alternating magnetic coils 10 and 11. Preferably a transformer 38 is interposed. The rectifiers 41 and 42 may be of the diode type having electrodes of one polarity, for example, anodes 39 and 40 connected to the ends of the secondary winding of the transformer 47 through the leads 43 and 44 and having cathodes 33 and 34 connected to the ends of the load resistor 49. The cathodes 33 and 34 are shown as filaments connected to heater batteries 31.

The remainder of the circuit is best described in connection with its operation. In order to adjust the apparatus, the phase detector D is disconnected by opening the switch 35 to the input transformer 47. The currents flowing in coils 17 and 18 are then balanced by throwing the switch 25 alternately into contact with the leads 23 and 24; shifting the contact 21a along 20 and varying the setting of condenser 26. In some instances it may be necessary to shift the slider 21a and then partially balance the coils 17—18 by adjustment of condenser 26 and then again shift the slider 21a and repeat the adjustment of the condenser until the current flows in these two coils are in substantial balance. During this time the multipoint switch 124 is disposed in the "a" position, in order to indicate voltage output from device B, being connected by lead 140 to the output lead 100 of B and thence through line 141 to the voltmeter "V," the other terminal of which is grounded at 142 and the circuit completed through the grounded output lead 101. An oscilloscope 143 is connected in parallel with the voltmeter "V" and the voltage and wave form may be observed on the screen 125. When the foregoing procedure has been properly carried out these indicating devices should show zero voltage.

Having made this adjustment, the apparatus is connected by closing the switch 35 directly to the phase sensitive detector D. A sample having a known defect is then inserted in the test coil and a phase adjustment is made at the device A, which will give the maximum signal for the known defect. With such an adjustment a defect will cause a substantial phase displacement which may be accompanied by a change in magnitude of the voltage. This adjustment will also usually produce a voltage between the slider 21a and ground that is almost in phase with the voltage across the coils 17—18. This voltage may be of a magnitude dependent upon magnetic characteristics of the tubes, as great as or less than that shown in Fig. 2 at the input to the amplifier B. It is amplified to the amplitude illustrated by Fig. 3 in case of an input as shown in Fig. 2.

As previously described, certain harmless variations in the article being tested cause magnitude variations in the voltage at the output of B. If these variations are large enough they may either cause the device D to indicate a defect or so decrease the sensitivity to a defect as to fail to provide the desired defect signal. Most commonly it causes defects to be indicated where there are none.

The phase sensitive detector D responds to variations in phase relationship between voltage at the leads 45 and 46 and the voltage at the leads 43 and 44. If the two voltages are in quadrature, the reference voltage between leads 45 and 46 and the voltage between points 44 and 48 will be in opposition during one-quarter of a cycle and will aid during the next quarter of the cycle. Likewise, the reference voltage and the voltage between the points 43 and 48 will aid during one-quarter cycle and will be in opposition during the next quarter cycle. However, owing to the interposition of the rectifiers 41 and 42 current can flow in only one direction in each of leads 43 and 44. This current flows only during the parts of each cycle when anodes 39 and 40 are positive with respect to cathodes 33 and 34 respectively. Thus current will flow in the opposite direction through the upper and lower points of the resistor 49. The net voltage drop averaged over a cycle will be zero. The fluctuation is smoothed by the condensers 37 so that the instrument 36 does not deflect in opposite directions during the cycle but remains at zero. On the other hand, if there is an in phase component or a component 180 degrees out of phase between the reference voltage between leads 45 and 46 and the input voltage to transformer 47, this in phase component causes a greater average current to flow through one-half of the resistor 49 than through the other half and the net voltage drop through the resistor 49 will be positive or negative, depending upon whether the above component is in phase or 180 degrees out of phase. Thus indications can be obtained from the instrument 16, the magnitude of which depends on how much the phase departs from quadrature. The phase control device A serves to cause zero output from the phase detector D, when there is no phase shift in the pick-up coils 17 and 18.

The device D is primarily sensitive to phase shifts. However, voltage of excessive magnitude between points 43 and 44 may cause unbalance in voltage across resistor 49, even though the reference voltage is in quadrature with the voltage between points 43 and 44. Therefore, means is provided to prevent voltages of excessive magnitude at points 43 and 44 which means does not affect the phase shifts which occur when defective material is passed through detector coils 17 and 18. This is accomplished by inserting a limiter between the output of the amplifier B and the detector D. One such limiter circuit is illustrated in the drawing at C, and comprises a vacuum tube 105 of the pentode type having a grid 104 connected through a series resistor 127 to the slider 103 of the potentiometer 102. The potentiometer is connected across the amplifier B output leads 100—101. The cathode 106 is heated by the battery 110. The cathode 106 and anode 109 are operated at such voltage that the tube, in normal testing, is driven beyond its overload point by any excessive input voltage on the grid 104. The battery for supplying the potentials is indicated at 115, and has a potentiometer 117 disposed thereacross, the slider 118 of the potentiometer being connected through the load resistor 114 to the anode 109. The condenser 116 by-passes any alternating current which might appear at the slider 118 to ground. When the slider is moved to the left the anode voltage is decreased.

The suppressor grid 108 is connected to the cathode 106. A variable resistor 111 is connected between the cathode and ground, enabling the D.-C. potential of the cathode above ground to be adjusted for any one D.-C. voltage in the anode. Voltage for the screen grid 107 is supplied from the battery 115 through the resistor 113.

The apparatus may be so operated that in a normal testing the vacuum tube 105 is driven beyond the overload point by the alternating-current potential applied to the grid 104. I have found, however, that it is not necessary to do so and that the apparatus may be made responsive to a wider range of magnetic characteristics with a given setting by so adjusting the operating potentials that the tube 105 is not normally driven beyond the overload point by alternating-current potential applied to the grid 104. Since tested-metal characteristics which cause amplitude modulations but which are not necessarily undesirable defects do not occur continuously as already pointed out, the limiter does not then normally receive a large enough signal to cause its limiting action to come into play. However, when a signal due to a harmless variable of sufficient magnitude is applied, the tube 105 limits this signal so that it will not operate the phase sensitive device such as indicated at D. It is not necessary or advantageous to reduce all voltages to the same level, but only to prevent overvoltage from affecting the circuit. Assuming a sine wave of excessive voltage amplitude as in Fig. 3, such as caused by a harmless variable applied to the lead 100, the sliding contact 118 and resistance 111 are adjusted so that at some point on the positive half cycle at the lead 100 the control grid 104 will become positive with respect to the cathode. This causes a direct current flow from grid to cathode. The grid series resistor 127 limits this current and also prevents the grid from becoming appreciably more positive than the cathode resulting in the chopping off or causing the positive half of the voltage wave to be square.

Because of the phase reversal between the control grid and the anode this results in chopping off or removal of the negative half of the anode A.-C. voltage. At some point on the negative half cycle of the voltage from the lead 100, control grid will become sufficiently negative to prevent current flow from the anode to the cathode; a further increase in negative voltage has no effect on anode current flow and because there is no current flowing through the resistor 114 the anode reaches and remains at the A.-C. potential existing at the slide 118, resulting in a chopping off of the positive peak of the A.-C. voltage in the output of the tube. Thus the limiter C is bipolar, acting to limit both positive and negative peaks. This causes a voltage wave output from the tube substantially like that illustrated in Fig. 4, which can be viewed on the screen of the oscilloscope 143 by switching the selector switch 124 to position "b." The adjustments of 118 and 111 are thus made to obtain the desired peak output and wave forms. An appreciable voltage variance may be applied to the input to C without producing any appreciable wave form change in the output provided that the voltage is always sufficiently great to afford the specified cutoff. The wave will also follow any phase shift of voltage applied to the input.

This square topped voltage wave form may be converted to a sine wave form as shown in Fig. 5 by passing the output from the tube 105 through a filter which includes the series condenser 119, the series reactor 121 and the shunt condenser and reactors 120 and 122, the output being connected through the switch 35 to the phase sensitive detector. The form of the wave at the output of the filter may be observed by shifting the switch 124 to the position C and viewing the same on the oscilloscope screen 125.

In operation the limiter is first set to pass a somewhat larger voltage than is required to satisfactorily operate the device D. This may be done by inserting in the test coils a specimen with a defect larger than the minimum size which it is desired to detect. With the test coil circuit balanced to give substantially zero output over a non-defective part of this specimen, the specimen is moved so as to pass the defect through or near the test coils. Phase shifter A is then adjusted to produce maximum signal on meter 16 as the defect passes the testing position. Another defect, known to be the minimum size which it is desired to detect, is then passed repeatedly through the test position and sliding contact 103 is adjusted until meter 16 just produces the desired deflection for this defect. This defect may be in the same specimen as used to set the phase shifter or in another specimen of similar material. If an automatic signalling device, not shown, is used in place of or in conjunction with meter 16, then the adjustment is made so that this minimum size defect just causes the signalling device to operate.

A harmless variable may then be passed repeatedly through the test position. As this is done, phase shifter A may be adjusted slightly to reduce the signal observed on meter 16 to a minimum. This adjustment is usually quite sharp in that a small phase adjustment makes a relatively large change in meter reading. This small phase adjustment usually has no significant effect upon sensitivity to a defect. However, it may be necessary to change slightly the position of sliding contactor 103 in order to again be able to detect the minimum defect. The harmless variable used in the above adjustment may conveniently be a small amount of powdered iron located within a metal tube if the testing device is being set up to test tubing, or it may be some powdered iron fastened to the outside of a metal tube or bar if the testing device is being set up to test either tubing or bars. Alternatively, some powdered iron or a small piece of iron or steel may be mounted on the end of a non-metallic rod or prod so that it can be inserted into the metal tubing or alongside of either a metal tube or bar. It should produce a signal at least as great as produced by the harmless variables usually found in the material being tested. Limiter C may then be adjusted until the voltage produced by this harmless variable, as shown on oscilloscope 143 or on meter V is about twice as great as that produced by the minimum defect. Oscilloscope 143 may be used to make sure that the limiter is operating to about an equal extent on both the positive and negative halves of the signal voltage. These adjustments are made with switch 124 in the "b" position.

It is possible, after some experience, to momentarily unbalance the balancing panel, such as by moving sliding contact 21a to produce a signal similar to that produced by a harmless variable, in order to adjust the limiter circuit. With the device so adjusted any variations in the article being tested which cause voltage variations or changes in magnitude will have little effect on D, although response to phase shift is not affected. Hence no false signals are caused nor are signals suppressed where phase shift in voltage or current is present in one of the test coils 17—18.

An alternative means of balancing the test coils is shown in Fig. 6. The direct current winding 29 and 30 and the specimen 27 or 28 are not shown in this figure. Test coils 145, 146 and 147 are shown with coils 145 and 147 connected in series with coil 146 connected in opposition to these two. With this arrangement test coil 146 is wound to produce twice as much voltage as either test coil 145 or 147. Test coil 146 is being placed in the middle while test coils 145 and 147 are placed on either side. This arrangement is used for testing a specimen without the use of a standard specimen. The section of the specimen linked to test coil 146 is compared to an average of the two sections linking coils 145 and 147. Generator 5A is connected to the primary winding of transformer 149. The secondary winding of transformer 149 is connected to the energizing coil 148 by lead 155. The other end of test coil 148 is connected to resistor 151 and potentiometer 153 by lead 157. Resistor 151 is grounded at a center tap 156. The other ends of resistor 151 and potentiometer 153 are connected to the primary 158 of air core transformer 150 by lead 159. The other end of the primary 158 of air core transformer 150 is connected to the secondary winding of transformer 149 by lead 154, thus completing the circuit. The secondary 160 of air core transformer 150 produces a voltage which is substantially 90 degrees out of phase with the current flowing through the primary winding 158 of the air core transformer 150. This voltage is impressed across potentiometer 152. The center tap 161 of the secondary winding 160 of the air core transformer 150 is connected to the sliding contact 162 on potentiometer 153. A voltage is developed across resistor 151 and potentiometer 153 in parallel which is substantially in phase with the current flowing through these elements. Since this is the same current which flows through the primary 158 of air core transformer 150, the voltages produced across resistor 151 and potentiometer 153 are substantially 90 degrees out of phase with the voltage produced in the secondary winding 160 of air core transformer 150. When the sliding contact 162 of potentiometer 153 is at the mid point of this potentiometer, it is substantially at ground potential. Under this condition, the center tap 161 of the secondary winding 160 on air core transformer 150 will also be substantially at ground potential. When the sliding contact 163 of potentiometer 152 is at the mid point, it is of substantially the same potential as the center tap 161 on the secondary winding 160 of air core transformer 150. When the sliding contact 163 on potentiometer 152 and the sliding contact 162 on potentiometer 153 are both at the mid point, then the right hand of test coil 147 is at ground potential. Under these conditions if the test coils 145, 146 and 147 are exactly balanced, there is zero input to amplifier B. However, in practice, it is generally impossible to make test coils 145, 146 and 147 exactly balanced. In this case, the sliding contact 163 on potentiometer 152 may be moved away from the center position to introduce a voltage component approximately 90 degrees out of phase with the current flowing in the energizing coil 148. The polarity of the voltage component produced will depend on the direction in which the sliding contact 163 is moved. Likewise, the sliding contact 162 on potentiometer 153 may be moved off the center point to provide a voltage component substantially in phase with the current flowing through the energizing coil 148. The polarity of this voltage will depend upon which direction the sliding contact 162 on potentiometer 153 is moved. It will thus be seen that within the limits of the voltages produced across potentiometers 153 and 152, any minor unbalance in the test coil system 145, 146 and 147 may be compensated by adjustment of sliders 162 and 163 on potentiometers 152 and 153. Thus the structure shown in Fig. 6 will provide substantially the same type of adjustment as provided by switch 25, variable condenser 26 and sliding contact 21a in Fig. 1. The structure shown in Fig. 6 has the advantage that normally very little current is flowing through the test coils 145, 146 and 147 so that the impedances of the coils have very little effect upon the testing operation.

In the arrangement of Fig. 6, the phase shifter A may be omitted. Instead provision is made for adjustment of the phase of the reference voltage applied through the transformer 38. For example, a mixer 164 may be connected to the resistor 151 and the secondary winding 160, and the mixer output may be connected to the primary winding of the transformer 38. To give a range of 180° to the reference voltage, the mixer is arranged to provide for varying the proportion of the voltage of either polarity across the winding 160 (approximately in quadrature with the current in the magnetizing coil 148) and voltage of one polarity in the upper half of the resistor 151 (in phase with the current in the coil 148). To this end a potentiometer resistor 165 is connected across the winding 160, a second potentiometer resistor 166 is grounded at both ends with the mid point connected to one end of the resistor 151, and a slider 167 is provided having brushes or contacts 168 and 169, contacting the resistors 165 and 166 respectively, and connected to the transformer 38. The center of the resistor 165 is at or close to ground potential and the ends are at maximum quadrature potentials of opposite polarities; the ends of the resistor 166 are at ground potential and the center is at maximum in-phase potential. The voltage between the brushes 168 and 169 is the vector sum of the potentials at the contacted points on the resistors 165 and 166. Consequently, as the slider 167 is moved along the quadrature component is increased and the in-phase component is decreased, or vice versa. In this manner the phase of the reference voltage applied through the transformer 38 may be varied.

Such an arrangement for applied reference voltage may also be employed in the embodiment of Fig. 1.

Having thus described my invention, I am aware that numerous and extensive departures may be made therefrom without departing from the spirit of the invention.

I claim:

1. An apparatus for non-destructive testing of elongated metal articles including a primary circuit and a secondary circuit, said primary circuit arranged to induce an alternating current or voltage in the secondary circuit and said article under test being adapted to be moved in proximity to said circuit and the character of the article adapted to influence the current generated in the secondary circuit, said alternating currents in the secondary having phase displacement caused by undesirable characteristics of the article and magnitude changes due to characteristics other than undesirable, circuit means connected to the secondary circuit to remove random variations in the current and comprising a filter, amplifier means connected to said filter for amplifying said signal, a limiter circuit connected to said amplifier circuit to maintain said signal within certain predetermined limits, and means in the output of the limiter circuit to change the signal to a sine wave and detector means connected to said last means for detecting phase shift in said signal.

2. An apparatus for non-destructive testing of elongated metal articles, including a primary circuit and a secondary circuit, said primary arranged to induce currents in the secondary circuit and said secondary circuit arranged to have a metal article passed in proximity thereto, said metal adapted to affect the currents induced in the secondary circuit, and means to control the output from the secondary circuit and to remove, from said currents, variations caused by other than undesirable characteristics of said article, said means including an amplifier circuit, a filter circuit connecting said amplifying circuit to said secondary circuit, a limiter circuit connected to the output of the filter circuit, means fed by the limiter circuit including a detector circuit for detecting phase shift in said signal, means in the output of the limiter circuit to change the signal substantially to a sine wave, signal-amplitude and limiter cut-off adjusting means, switch means interposed in said connections and connecting indicating means thereto to enable analysis of said circuit during adjustment.

3. An apparatus for non-destructive testing of elongated metal articles including a primary circuit and a secondary circuit, said primary arranged to induce currents in the secondary circuit and said secondary circuit arranged to have a metal article passed in proximity thereto, said metal adapted to affect the curents induced in the secondary circuit, and means to control the output from the secondary circuit and to remove, from said currents, variations caused by other than undesirable characteristics of said article, said means including an amplifier circuit and a limiter circuit connected to the output of the amplifier circuit, means fed by the limiter circuit including a detector circuit for detecting phase shift in said signal, means in the output of the limiter circuit to change the signal substantially to a sine wave, signal-amplitude and limiter cut-off adjusting means and switch means interposed in said connections and connecting indicating means thereto to enable analysis of said circuit during adjustment.

4. An apparatus for non-destructive testing of elongated metal articles including a primary circuit and a secondary circuit, said primary circuit arranged to induce an alternating current or voltage in the secondary circuit and said article under test being adapted to be moved in proximity to said circuit and the character of the article adapted to influence the current generated in the secondary circuit, said alternating circuits in the secondary having phase displacement caused by undesirable characteristics of the article and magnitude changes due to characteristics other than undesirable, amplifier means connected to said secondary circuit for amplifying said signal, a limiter circuit connected to said amplifier circuit to maintain said signal within certain predetermined limits, means in the output of the limiter circuit to change the signal to substantially a sine wave, and detector means connected to said last means for detecting phase shift in said signal.

5. A method of testing articles for defects which comprises generating a signal, using the article being tested to modulate the signal to provide a signal having phase modulations for undesirable defects and incidental amplitude modulations due to the characteristics of the articles other than undesirable defects, amplifying said signal to a predetermined amplitude, limiting the amplitude of the signal to a predetermined value to remove the effect of amplitude modulation, filtering the signal to reconvert it to substantially a sine wave, and detecting phase modulation in said signal.

6. The method of testing articles for defects which comprises generating a signal, using the article being tested to modulate the signal to provide a signal having phase modulations for undesirable defects and incidental amplitude modulations due to characteristics of the article other than undesirable defects, limiting the amplitude of the signal to a predetermined value to remove the effect of amplitude modulations, filtering the signal to reconvert it to substantially a sine wave, and detecting phase modulation in said signal.

7. A testing circuit of the class described, including circuit means to apply an alternating current to an article being tested, a bridge circuit having a pair of pickup coils included therein and arranged to have currents induced therein from said alternating current circuit, said article being tested being adapted to affect the characteristics of the induced current when moved in proximity to the pickup coils, an amplifier circuit connected to the output of the bridge circuit for amplifying the signals from the bridge to a predetermined value, a limiter connected to the amplifier circuit and arranged to limit the amplitude of the signal to a predetermined value, a filter connected to the limiter circuit for converting the limiter output to substantially a sine wave and means connected to the output of the filter for detecting phase shift in the signal.

8. A testing circuit of the class described, including circuit means to apply an alternating current to an article being tested, a bridge circuit having a pair of pickup coils included therein and arranged to have currents induced therein from said alternating current circuit, said article being tested being adapted to affect the characteristics of the induced current when moved in proximity to the pickup coils, an amplifier circuit for amplifying the voltage, a limiter circuit to limit the voltage to a predetermined level, a filter connected to the limiter circuit to convert the signal substantially to a sine wave and means connected to the output of the filter for detecting phase shift in the signal.

FREDERICK A. MEUNIER.

REFERENCES CITED

The following references are of record in the file of this patent:

UNITED STATES PATENTS

| Number | Name | Date |
|---|---|---|
| Re. 21,003 | Knerr et al. | Feb. 14, 1939 |
| 1,954,996 | Hehn | Apr. 17, 1934 |
| 2,005,011 | Specht | June 18, 1935 |
| 2,223,840 | Wolff | Dec. 8, 1940 |
| 2,271,203 | Okrent | Jan. 27, 1942 |
| 2,276,565 | Crosby | Mar. 17, 1942 |
| 2,290,330 | Irwin | July 21, 1942 |